United States Patent Office 3,660,538
Patented May 2, 1972

3,660,538
HEAT-RESISTANT COMPOSITION COMPRISING CHLORINATED POLYVINYL CHLORIDE AND COPOLYMER OF METHYL METHACRYLATE AND ALPHAMETHYL STYRENE
Toshiharu Matsumiya, Kawasaki-Nishi, Japan, assignor to Tokuyama Sekisui Kogyo Kabushiki Kaisha, Osaka-shi, Japan
No Drawing. Filed June 1, 1970, Ser. No. 42,577
Claims priority, application Japan, June 24, 1969, 44/49,846
Int. Cl. C08f $29/24$
U.S. Cl. 260—899                                    4 Claims

ABSTRACT OF THE DISCLOSURE

The present invention relates to a method for improving the heat resistance of chlorinated polyvinyl chloride resins by adding a copolymer of methyl methacrylate and α-methyl styrene to the polyvinyl chloride, and to a heat resistant resin composition formed of a blend of 80–97 parts of chlorinated polyvinyl chloride resin and correspondingly 20–3 parts of a copolymer of methyl methacrylate and α-methyl styrene.

BACKGROUND OF THE INVENTION

Polyvinyl chloride resin has been used widely in various fields because of its properties of good stiffness and high tensile strength as well as good weatherability, flame resistance, and chemical resistance. Heretofore, polyvinyl chloride resin has not been useful in some fields for various reasons. The primary reason is that ordinary polyvinyl chloride resin cannot be used at temperatures higher than 70–80° C. Polyvinyl chloride resin has a low softening point and is liable to become soft and deformed at such temperatures.

In order to improve performance, it has been proposed to post-chlorinate polyvinyl chloride resin to produce what is normally called "chlorinated polyvinyl chloride resin." However, even chlorinated polyvinyl chloride resin is not sufficiently heat resistant. The heat resistance of polyvinyl chloride resin tends to improve as the chlorine percent increases therein. Therefore the heat resistance may be expected to be increased to some extent by increasing chlorine percent thereof. It has been proven however, that the heat resistance of chlorinated polyvinyl chloride resin cannot be increased in this way to such an extent that it can be used for extended periods at temperatures as high as 100° C. Under such conditions the mechanical strength of even highly chlorinated polyvinyl chloride resin, particularly its tensile strength, is severely reduced in comparison to its strength at room temperature. Furthermore, when the chlorine percent of polyvinyl chloride is increased, the flow property of the resin at high temperature becomes worse and hence the processability of the resin is reduced. Thus high quality chlorinated polyvinyl chloride resin cannot be made simply by increasing the chlorine percent thereof through post-chlorination.

SUMMARY OF THE INVENTION

It is an object of this invention to form a resin composition which can be used for a long time at high temperatures, for example at 100° C. which also can be easily processed, and which, in addition has the advantageous characteristics of polyvinyl chloride.

It has now been discovered that, when a specific amount of a copolymer of methyl methacrylate and α-methyl styrene, in the ratio described hereinbelow, is added to chlorinated polyvinyl chloride resin, the polymers can be blended uniformly and the resulting polymer composition shows considerably increased heat resistance as well as good processability.

DETAILED DESCRIPTION

The heat resistant resin composition of the invention comprises (a) 80–97 parts by weight of chlorinated polyvinyl chloride resin containing more than 60 weight percent chlorine and correspondingly (b) 20–3 parts by weight of copolymer of methyl methacrylate and α-methyl styrene wherein 70–90 weight percent is methyl methacrylate and remainder of 30–10 weight percent is α-methyl styrene.

The chlorinated polyvinyl chloride resin used in this invention may be prepared by chlorinating polyvinyl chloride resin in any conventional way, for example, as a powder, in aqueous suspension, or while dissolved in a solvent. Ordinary polyvinyl chloride resin contains 56.7 weight percent chlorine calculating from the molecular formula, and in practice it has been found to contain approximately the calculated amount of chlorine. However, when polyvinyl chloride resin is further chlorinated, a resin containing 57–70 weight percent chlorine is usually obtained. The resin which is thereby obtained has increased heat resistance which improves as the chlorine percent thereof becomes higher. It has now been found that, when a copolymer of methyl methacrylate and α-methyl styrene is incorporated with a chlorinated polyvinyl chloride resin having a chlorine content of higher than 60 weight percent, the resin composition thus obtained has excellent heat resistance and processability. Particularly good results are obtained, when chlorinated polyvinyl chloride resin having a chlorine content of 65–68 weight percent is employed.

The copolymer of methyl methacrylate and α-methyl styrene used in this invention is already known. Such copolymer may be prepared by any suitable method such as emulsion copolymerization, bulk copolymerization, or suspension copolymerization. Processes for preparing such copolymer are disclosed, for example in Japanese patent publication No. 26,187/68 and U.S. Pat. No. 3,072,622. In these processes, the aforesaid copolymer is prepared by mixing methyl methacrylate with α-methyl styrene in a desired ratio, and then copolymerizing the mixture in the presence of a polymerization catalyst. For use in this invention the ratio of the methyl methacrylate to α-methyl styrene must be within a definite range. That ratio should be between about 9:1 and 7:3, or such that the methyl methacrylate in the copolymer is 70–90 percent by weight and α-methyl styrene 30–10 percent by weight.

Furthermore, in this invention, aforesaid chlorinated polyvinyl chloride resin and aforesaid copolymer will advantageously be blended within definite proportions. That is, 97 to 80 parts by weight of chlorinated polyvinyl chloride resin should be blended with 3 to 20 parts by weight of copolymer.

It has been stated herein that the chlorine percent in the chlorinated polyvinyl chloride resin, the ratio of methyl methacrylate to α-methyl styrene in the copolymer, and the relative proportions of the chlorinated polyvinyl chloride resin and the copolymer should be within particular limits. When the aforesaid relative proportions are varied the resin compositions formed are continuously and slightly varied in their properties. Thus, it is generally difficult to clearly define the ranges of the preferable ratios. However, summarizing many experimental results, the following explanation can be provided. That is, as the chlorine percent of the chlorinated polyvinyl chloride resin to be blended with the copolymer increases, its processability decreases, although the heat resistance increases. Thereupon, when the above-mentioned copolymer is added to the chlorinated polyvinyl chloride resin, the resin compositions thus obtained are improved in their processability, and in these cases, the higher the chlorine content of the chlorinated polyvinyl chloride resin, the more remarkable is the effect of adding the copolymer. In regard to the composition ratio in aforesaid copolymer, good results are obtained when the ratio is within the range where methyl methacrylate is 70–90 weight percent and α-methyl styrene 30–10 weight percent, because when the copolymer within said range is added to the chlorinated polyvinyl chloride resin, the tensile strength at high temperatures of the blended resin compositions are particularly improved. However, if the copolymer within said range is less than 3 weight percent in the resin composition, the resin composition is not remarkably improved in its properties. On the other hand, if the copolymer is more than 20 weight percent of said resin composition, the resin composition is reduced in the tensile strength and heat resistance at high temperature (e.g. at 100° C.) although it is increased in the tensile strength at room temperature. Therefore, the ratio of the copolymer to be added to the chlorinated polyvinyl chloride resin should be 3-20 parts by weight. For these reasons, the components used in this invention should be in the above-mentioned ranges.

The above explanations were directed to resin compositions containing only chlorinated polyvinyl chloride resin and the copolymer described herein, but it should be understood that the resin composition of this invention may also contain various additives and adjuvants such as fillers, pigments, stabilizers, etc. it only being necessary to maintain the relative proportions of the chlorinated polyvinyl chloride and copolymer within the ranges set forth.

The invented resin composition has the advantage that the heat resistance thereof is high and also the processability thereof is good when it is fabricated under heating. In particular, the resin composition has good mechanical strength at high temperatures of e.g., 100° C. Therefore, an article such as a pipe made from said resin composition can be used at temperatures of about 100° C.

The outstanding characteristics of the resin composition will become more apparent by the following examples wherein the procedures for measuring the properties in the examples were as follows.

(a) Flexural temperature: Conducted by the method shown in 7.3 softening temperature test of JISK–6745.

(b) Flow rate: The amount of the resin flowing out through a heated orifice under a definite pressure as measured by means of a Koka-type flow tester, wherein a tip of a sheet prepared by kneading the resin composition is used. The inner diameter of the orifice is 1 mm. and its length 1 mm., the pressure is 200 kg./cm.$^2$, and the temperature is 190–200° C.

(c) Tensile strength: The tensile strength is measured according to the method at a tension speed of 10 mm. 7.1 tension test of JIS K–6745 min., load of 50 kg./cm.$^2$, and at temperatures of 20° C., and 100° C. by means of a Schopper's tensile tester, using Dumbbell No. 1 as the test specimen.

Example 1

A polyvinyl chloride resin, prepared by a conventional polymerization method is chlorinated to provide a chlorinated polyvinyl chloride resin having 67.5 percent chlorine. A copolymer is formed by copolymerizing methyl methacrylate with α-methyl styrene. To portions of this chlorinated polyvinyl chloride resin, there are added varying amounts of the copolymer of 20 weight percent α-methyl styrene and 80 weight percent methyl methacrylate. 100 parts of the mixture, together with 2 parts by weight of tribasic lead sulfate, 2 parts by weight of dibasic lead phosphite, 1 part by weight of lead stearate, and 1 part by weight of calcium stearate as the stabilizer, are thoroughly mixed and then kneaded by means of a mixing roll at 180° C. It is then formed into a sheet having a thickness of 0.35 mm. Several sheets thus prepared are piled and pressed together at 190° C. to provide two plates having a thickness of 2 mm. and 1 mm., respectively.

The properties of the plate thus prepared, namely the flow rate at 200° C., the flexural temperature, and the tensile strength at 20° C. and 100° C., respectively, are measured, the results of which are as shown in Table I.

TABLE I

| Resin composition | | Property | | | |
|---|---|---|---|---|---|
| Chlorinated polyvinyl chloride resin [1] | Co-polymer [2] | Flexural temperature (° C.) | Flow rate at 200° C. (cc./sec.) | Tensile strength at 20° C. (kg./cm.$^2$) | Tensile strength at 100° C. (kg./cm.$^2$) |
| 100 | 0 | 114 | 5.6×10$^{-2}$ | 713 | 230 |
| 98 | 2 | 114 | 6.2×10$^{-2}$ | 717 | 315 |
| 97 | 3 | 115 | 6.6×10$^{-2}$ | 720 | 340 |
| 95 | 5 | 116 | 7.2×10$^{-2}$ | 729 | 390 |
| 90 | 10 | 118 | 8.4×10$^{-2}$ | 740 | 380 |
| 85 | 15 | 120 | 8.6×10$^{-2}$ | 750 | 330 |
| 80 | 20 | 121 | 8.8×10$^{-2}$ | 780 | 330 |
| 70 | 30 | 118 | 9.0×10$^{-2}$ | 750 | 250 |

[1] A post-chlorinated polyvinyl chloride resin having 67.5 percent chlorine.
[2] A copolymer of 80 percent methyl methacrylate and 20 percent α-methyl styrene.

Example 2

Resin compositions of chlorinated polyvinyl chloride resin and the copolymer of Example 1 are prepared except that a chlorinated polyvinyl chloride resin containing 64.6 weight percent of chlorine is used. The properties of the resin composition are measured by the same procedure as in Example 1, except that the temperature at which the flow rate is measured is 190° C. The results are shown in Table II.

TABLE II

| Resin composition | | Property | | | |
|---|---|---|---|---|---|
| Chlorinated polyvinyl chloride resin [1] | Co-polymer [2] | Flexural temperature (° C.) | Flow rate at 200° C. (cc./sec.) | Tensile strength at 20° C. (kg./cm.$^2$) | Tensile strength at 100° C. (kg./cm.$^2$) |
| 100 | 0 | 102 | 12.0×10$^{-2}$ | 657 | 200 |
| 97 | 3 | 102 | 12.8×10$^{-2}$ | 660 | 240 |
| 95 | 5 | 103 | 14.2×10$^{-2}$ | 662 | 290 |
| 90 | 10 | 104 | 15.6×10$^{-2}$ | 689 | 380 |
| 80 | 20 | 106 | 17.4×10$^{-2}$ | 727 | 280 |
| 70 | 30 | 108 | 18.0×10$^{-2}$ | 735 | 230 |

[1] A chlorinated polyvinyl chloride resin having 64.6 percent chlorine.
[2] The same copolymer as in Table I.

Example 3

Resin compositions of chlorinated polyvinyl chloride resin and copolymer are prepared by the same procedure as Example 1 except that chlorinated polyvinyl chloride resin having a chlorine content of 60.7 percent is used. The properties of the resin composition are measured by the same procedures as in Example 2. The results are shown in Table III.

TABLE III

| Resin composition | | Property | | | |
|---|---|---|---|---|---|
| Chlorinated ployvinyl chloride resin [1] | Co-polymer [2] | Flexural temperature (° C.) | Flow rate at 190°/C. (cc./sec.) | Tensile strength at 20°/C. (kg./cm.$^2$) | Tensile strength at 100° C. (kg./cm.$^2$) |
| 100 | 0 | 91 | 32.0×10$^{-2}$ | 600 | 190 |
| 97 | 3 | 91 | 32.3×10$^{-2}$ | 612 | 220 |
| 95 | 5 | 92 | 34.1×10$^{-2}$ | 623 | 256 |
| 90 | 10 | 93 | 36.8×10$^{-2}$ | 642 | 263 |
| 80 | 20 | 97 | 38.3×10$^{-2}$ | 680 | 330 |
| 70 | 30 | 98 | 40.0×10$^{-2}$ | 690 | 220 |

[1] A chlorinated polyvinyl chlorine resin having 60.7 percent chlorine.
[2] The same copolymer as in Table I.

From the above tables, it is confirmed that, by adding a copolymer of methyl methacrylate and α-methyl styrene to chlorinated polyvinyl chloride resin, the flexural temperatures and tensile strengths at 100° C. are improved. Also, it is clear in view of the fact that the flow rate is increased that the processability of the resin composition is also improved.

Example 4

To the chlorinated polyvinyl chloride resin of Example 1 having 67.5 percent chlorine there is added a copolymer of 10 weight percent α-methyl styrene and 90 weight percent methyl methacrylate. The mixture thus obtained is formed into the plate having 2 mm. and 1 mm. thick respectively by the same procedure as in Example 1.

Using the plate thus obtained, the same measurements were conducted as in Example 1, the results of which are shown in Table IV.

TABLE IV

| Resin composition | | Property | | | |
|---|---|---|---|---|---|
| Chlorinated polyvinyl chloride resin [1] | Co-polymer [2] | Flexural tempera-ture (° C.) | Flow rate at 200° C. (cc./sec.) | Tensile strength at 20° C. (kg./cm.$^2$) | Tensile strength at 100° C. (kg./cm.$^2$) |
| 100 | 0 | 114 | 5.6×10$^{-2}$ | 713 | 230 |
| 97 | 3 | 115 | 6.8×10$^{-2}$ | 720 | 350 |
| 95 | 5 | 116 | 7.5×10$^{-2}$ | 725 | 400 |
| 90 | 10 | 116 | 8.8×10$^{-2}$ | 730 | 432 |
| 80 | 20 | 112 | 10.7×10$^{-2}$ | 735 | 370 |
| 70 | 30 | 111 | 11.8×10$^{-2}$ | 733 | 270 |

[1] A chlorinated polyvinyl chloride resin having 67.5 percent chlorine.
[2] A copolymer of 90 percent methyl methacrylate and 10 percent α-methyl styrene.

From Table IV it is confirmed that the tensile strength at 100° C. of the resin composition increases significantly when increasing amounts of the copolymer are added, the improvement reaching a peak at a copolymer content of about 10 percent. Table IV also confirms that the processability of the resin composition is good, because the flow rate thereof is increased.

Example 5

Resin compositions of chlorinated polyvinyl chloride resin (67.5% chlorine) and copolymer in various ratios are prepared by the same procedures as in Example 1, using a copolymer containing 30 weight percent of α-methyl styrene and 70 weight percent of methyl methacrylate. The properties of the composition are measured, with results shown in Table V.

TABLE V

| Resin composition | | Property | | | |
|---|---|---|---|---|---|
| Chlorinated polyvinyl chloride resin [1] | Co-polymer [2] | Flexural tempera-ture (° C.) | Flow rate at 200° C. (cc./sec.) | Tensile strength at 20° C. (kg./cm.$^2$) | Tensile strength at 100° C. (kg./cm.$^2$) |
| 100 | 0 | 114 | 5.6×10$^{-2}$ | 713 | 230 |
| 97 | 3 | 115 | 6.3×10$^{-2}$ | 720 | 320 |
| 95 | 5 | 117 | 6.8×10$^{-2}$ | 735 | 364 |
| 90 | 10 | 115 | 7.7×10$^{-2}$ | 738 | 340 |
| 85 | 15 | 114 | 8.1×10$^{-2}$ | 770 | 302 |
| 80 | 20 | 112 | 8.4×10$^{-2}$ | 778 | 250 |
| 70 | 30 | 110 | 8.7×10$^{-2}$ | 765 | 150 |

[1] A chlorinated polyvinyl chloride resin having 67.5 percent chlorine.
[2] A copolymer of 70 percent methyl methacrylate and 30 percent α-methyl styrene.

It is seen from Table V, that the processability and tensile strength of the resin composition are improved when a copolymer containing 30 weight percent of α-methyl styrene is used.

Comparative Example 1

Resin compositions of chlorinated polyvinyl chloride resin (67.5% chlorine) and copolymer in various ratios are prepared by the same procedure as in Example 1, except that a copolymer containing 3 weight percent of α-methyl styrene and 97 weight percent of methyl methacrylate is used. The properties of the resin compositions are then measured. The results are shown in Table VI.

TABLE VI

| Resin composition | | Property | | | |
|---|---|---|---|---|---|
| Chlorinated polyvinyl chloride resin [1] | Co-polymer [2] | Flexural tempera-ture (° C.) | Flow rate at 200° C. (cc./sec.) | Tensile strength at 20° C. (kg./cm.$^2$) | Tensile strength at 100° C. (kg./cm.$^2$) |
| 100 | 0 | 114 | 5.6×10$^{-2}$ | 713 | 230 |
| 97 | 3 | 114 | 7.3×10$^{-2}$ | 717 | 233 |
| 95 | 5 | 113 | 8.2×10$^{-2}$ | 719 | 242 |
| 90 | 10 | 112 | 10.1×10$^{-2}$ | 724 | 239 |
| 80 | 20 | 110 | 13.0×10$^{-2}$ | 728 | 196 |
| 70 | 30 | 105 | 14.8×10$^{-2}$ | 727 | 119 |

[1] A chlorinated polyvinyl chloride resin having 67.5 percent chlorine.
[2] A copolymer of 97 percent methyl methacrylate and 3.0 percent α-methyl styrene.

Table VI shows that the tensile strength at 100° C. of the resin composition is slightly increased when a copolymer containing 3 percent by weight of α-methyl styrene is used.

Example 6

In this example, resin compositions of chlorinated polyvinyl chloride and copolymer in various ratios are prepared by the same procedures as in Example 1, except that a copolymer containing 13 weight percent of α-methyl styrene and 87 weight percent of methyl methacrylate is employed. The properties of the resin composition are measured and are shown in Table VII.

TABLE VII

| Resin composition | | Property | | | |
|---|---|---|---|---|---|
| Chlorinated polyvinyl chloride resin [1] | Co-polymer [2] | Flexural tempera-ture (° C.) | Flow rate at 200° C. (cc./sec.) | Tensile strength at 20° C. (kg./cm.$^2$) | Tensile strength at 100° C. (kg./cm.$^2$) |
| 100 | 0 | 114 | 5.6×10$^{-2}$ | 713 | 230 |
| 97 | 3 | 115 | 6.7×10$^{-2}$ | 722 | 350 |
| 95 | 5 | 115 | 7.3×10$^{-2}$ | 726 | 380 |
| 90 | 10 | 116 | 8.5×10$^{-2}$ | 735 | 415 |
| 80 | 20 | 115 | 10.2×10$^{-2}$ | 743 | 350 |
| 70 | 30 | 114 | 11.3×10$^{-2}$ | 738 | 250 |

[1] A chlorinated polyvinyl chloride resin having 67.5 percent chlorine.
[2] A copolymer of 87 percent methyl methacrylate and 13 percent α-methyl styrene.

Example 7

Resin compositions of chlorinated polyvinyl chloride resin and copolymer in various ratios are prepared, and the properties of the resin compositions are measured by the same procedures as in Example 1, except that a copolymer containing 16 weight percent α-methyl styrene and 84 weight percent methyl methacrylate is used. The results are as shown in Table VIII.

TABLE VIII

| Resin composition | | Property | | | |
|---|---|---|---|---|---|
| Chlorinated polyvinyl chloride resin [1] | Co-polymer [2] | Flexural tempera-ture (° C.) | Flow rate at 200° C. (cc./sec.) | Tensile strength at 20° C. (kg./cm.$^2$) | Tensile strength at 100° C. (kg./cm.$^2$) |
| 100 | 0 | 114 | 5.6×10$^{-2}$ | 713 | 230 |
| 95 | 5 | 115 | 7.3×10$^{-2}$ | 726 | 345 |
| 90 | 10 | 115 | 8.4×10$^{-2}$ | 737 | 410 |
| 80 | 20 | 116 | 9.5×10$^{-2}$ | 754 | 320 |
| 70 | 30 | 117 | 9.9×10$^{-2}$ | 748 | 260 |

[1] A chlorinated polyvinyl chloride resin having 67.5 percent chlorine.
[2] A copolymer of 84 percent methyl methacrylate and 16 percent α-methyl styrene.

Comparative Example 2

Resin compositions of chlorinated polyvinyl chloride resin and copolymer are prepared and then the properties of the resulting compositions are measured by the same procedures as in Example 1. For these comparisons the chlorinated polyvinyl chloride resin contains 58.2 weight percent chlorine and the copolymer contains 20 weight percent α-methyl styrene. The results are as shown in Table IX.

TABLE IX

| Resin composition | | Property | | | |
|---|---|---|---|---|---|
| Chlorinated polyvinyl chloride resin [1] | Co-polymer [2] | Flexural temperature (° C.) | Flow rate at 190°/C. (cc./sec.) | Tensile strength at 20°/C. (kg./cm.$^2$) | Tensile strength at 100° C. (kg./cm.$^2$) |
| 100 | 0 | 86 | 38.0×10$^{-2}$ | 570 | 150 |
| 95 | 5 | 87 | 39.2×10$^{-2}$ | 575 | 160 |
| 90 | 10 | 87 | 40.0×10$^{-2}$ | 580 | 174 |
| 80 | 20 | 88 | 41.4×10$^{-2}$ | 600 | 190 |
| 70 | 30 | 89 | 41.8×10$^{-2}$ | 620 | 158 |

[1] A chlorinated polyvinyl chloride resin having 58.2 percent chlorine.
[2] A copolymer of 80 percent methyl methacrylate and 20 percent α-methyl styrene.

On comparing the results shown in the above examples with the results shown in the comparison example, it will be understood that good heat resistant resin compositions having improved flow rates at 190–200° C., and which therefore are of good processability can be prepared by blending chlorinated polyvinyl chloride resin containing more than 60 weight percent of chlorine with a copolymer of methyl methacrylate and α-methyl styrene in which the former constitutes 70–90 weight percent and the latter 30–10 weight percent, in relative proportions of 80–97 weight parts of the chlorinated polyvinyl chloride resin and 20–3 weight parts of said copolymer.

What is claimed is:

1. A heat resistant resin composition comprising the components
   (a) 80–97 parts by weight of chlorinated polyvinyl chloride resin containing 60 to 70 weight percent chlorine; and
   (b) 20–3 parts by weight of copolymer consisting essentially of 70–90 weight percent of methyl methacrylate and 30–10 weight percent of alpha-methyl styrene.

2. The heat resistant resin composition of claim 1 wherein the chlorine content of the chlorinated polyvinyl chloride resin is between 65 and 68 percent.

3. A method for improving the heat resistance of polyvinyl chloride resin comprising the steps of
   (a) chlorinating said polyvinyl chloride to a chlorine content of at least 60 percent by weight; and
   (b) adding to 80–97 parts by weight of the thus chlorinated product under (a) 20–3 parts by weight of a copolymer consisting essentially of 70–90 weight percent of methyl methacrylate and 30–10 weight percent of alpha-methyl styrene.

4. The method of claim 3 wherein the chlorinated polyvinyl chloride has a chlorine content of between about 60 and 70 percent by weight.

References Cited
UNITED STATES PATENTS

| | | | |
|---|---|---|---|
| 3,541,185 | 11/1970 | Taima et al. | 260—876 |
| 2,791,600 | 5/1957 | Schwaegerle | 260—45.5 |
| 3,560,592 | 2/1971 | Decroly et al. | 260—876 |
| 2,887,464 | 5/1959 | Coover et al. | 260—45.5 |

MURRAY TILLMAN, Primary Examiner

J. SEIBERT, Assistant Examiner

U.S. Cl. X.R.

260—23 AR, 23 XA, 23 S, 30.6 R, 30.8 R